(12) United States Patent
Kennedy et al.

(10) Patent No.: US 8,110,115 B2
(45) Date of Patent: Feb. 7, 2012

(54) MOBILE WATER TREATMENT

(75) Inventors: James Vance Kennedy, Rexburg, ID (US); Bron David Wescott, Teton, ID (US); Stanley Lamar Sanford, Jacksonville, FL (US)

(73) Assignee: Ibex Incorporated, Rexburg, ID (US)

( * ) Notice: Subject to any disclaimer, the term of this patent is extended or adjusted under 35 U.S.C. 154(b) by 0 days.

(21) Appl. No.: 12/974,554

(22) Filed: Dec. 21, 2010

(65) Prior Publication Data

US 2011/0089123 A1 Apr. 21, 2011

(51) Int. Cl.
*B01D 37/00* (2006.01)
*B01D 43/00* (2006.01)
*C02F 1/00* (2006.01)
*B60P 3/00* (2006.01)
*B01D 29/00* (2006.01)
*B01D 29/88* (2006.01)
*B01D 35/02* (2006.01)

(52) U.S. Cl. .................. 210/767; 210/808; 210/170.04; 210/171; 210/172.1; 210/416.1; 210/323.1; 210/241; 210/464; 137/899; 137/351

(58) Field of Classification Search ............. 210/170.04, 210/171, 172.1, 241, 464; 137/899, 351
See application file for complete search history.

(56) References Cited

U.S. PATENT DOCUMENTS

| | | | |
|---|---|---|---|
| 4,383,920 A | 5/1983 | Muller et al. | |
| 4,474,254 A * | 10/1984 | Etter et al. | 175/206 |
| 4,534,869 A | 8/1985 | Seibert | |
| 4,659,460 A | 4/1987 | Muller et al. | |
| 4,871,449 A | 10/1989 | Lott | |
| 5,312,551 A | 5/1994 | Perron et al. | |
| 6,089,420 A * | 7/2000 | Rodriguez | 222/608 |
| 2006/0249454 A1* | 11/2006 | Staschik | 210/631 |

* cited by examiner

*Primary Examiner* — Benjamin Kurtz
(74) *Attorney, Agent, or Firm* — Oblon, Spivak, McClelland, Maier & Neustadt, L.L.P.

(57) ABSTRACT

A mobile water treatment apparatus to on-load a dirty fluid into a storage container attached to a motor vehicle and transport the fluid in the storage container from a first location and to a second location where the fluid is filtered by a filtration system attached to the motor vehicle. The filtered fluid is discharged from the mobile water treatment apparatus at the second location.

20 Claims, 8 Drawing Sheets

MOBILE WATER TREATMENT

BACKGROUND

1. Field of the Disclosure

This disclosure relates generally to a fluid transport and filtration system, and more particularly to a water transport and filtration system for oil and gas well operations.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Water is essential to the oil and gas industry. In an oil or gas well, water is used to cool and lubricate the drillbit and to extract debris. Accordingly, drilling a well may require hundreds of thousands of gallons of water. Water is also recovered as a byproduct of oil and gas wells as produced water.

Furthermore, the process of hydraulic fracture uses a large amount of water. Hydraulic fracture, or fracking, is a commonly used process to increase production and recovery in an oil or gas well. In hydraulic fracture, fluid is injected at high pressure into a well to crack or fracture the rock structures possessing hydrocarbons. The fracture width is usually maintained through the use of a proppant such as sand, ceramic, or other particulates. Maintaining the fracture width allows hydrocarbons to flow to the surface of the well. In addittition to fracturing the rock, water also serves as a transport medium for the proppant. Accordingly, the hydraulic fracture process requires millions of gallons of water per well. Often, a large percentage of the water used in hydraulic fracture is recovered as flowback water.

Consequently, oil and gas companies must supply oil and gas wells with the requisite amount of water, and must manage the flowback and produced water recovered from the well. To accommodate the supply need, water is typically transported through temporary pipelines or trucked to the well site. However, water recovered from the well is unclean and filled with hydrocarbons, suspended solids, heavy metals, and bacteria. The recovered water must therefore be filtered and cleaned before it can be reused in the fracking process or introduced into the environment. For this reason, the recovered water is typically trucked from the well site to a filtering location, and then trucked from the filtering location to its next destination. The process of using trucks to transport the water increases the volume of traffic on roads and requires fossil fuels to power the trucks. Similarly, a company may construct a piping system to pump the water through the piping system to and from a filtering location, but such a piping system is a considerable expense. As an alternative to transporting the water by truck or constructing a piping system, a filtering company may set up a facility at the well site to filter the water, or bring in a large filtration system attached to a trailer to reuse the flowback water for the hydraulic fracturing process. However, this requires additional expense to set up a filtering facility. Furthermore, once the hydraulic fracture process is complete, the recovered water must be transported to another location.

Historically, filtration systems have been too large or too heavy to allow for easy transport. This is especially true because the overall weight of a water transportation truck is regulated by the Department of Transportation.

SUMMARY

The inventors recognized that what is needed is a process for transporting and filtering water that reduces the overall water procurement, transport, disposal, and filtering costs.

This disclosure identifies and addresses problems associated with managing water for oil and gas wells. In particular, it is identified that it is inefficient for an oil and gas company to transport water to and from a filtration facility located a distance away from the well site. It is also inefficient to maintain separate and distinct water transport and water filtration steps.

The mobile water treatment apparatus described herein is designed to address these issues. In particular, the mobile water treatment apparatus described herein is adapted to both transport and filter a fluid retrieved from a first location to a second location, thus avoiding transportation costs attributed to moving water to and from an off-site filtration facility.

In view thereof, disclosed herein are aspects of a mobile water treatment apparatus which includes a filtration system, a motor vehicle, a fluid storage container, and a fluid delivery pump. In one example of the invention, the fluid delivery pump is configured to on-load a fluid into the fluid storage container. The filtration system filters the fluid directed into the filtration system, and the filtration system and fluid storage container are affixed to the motor vehicle. The motor vehicle is configured to transport the fluid inside the fluid storage container from a first location to a second location.

In another exemplary embodiment, the method for mobile water treatment includes retrieving a fluid from a first location, storing the fluid in a fluid storage container attached to a motor vehicle, transporting the fluid to a second location, dispensing the fluid from the fluid storage container, and filtering the fluid through a filtration system attached to the motor vehicle.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Referring now to the drawings, wherein like reference numerals designate identical or corresponding parts throughout the several views.

Figure 1:
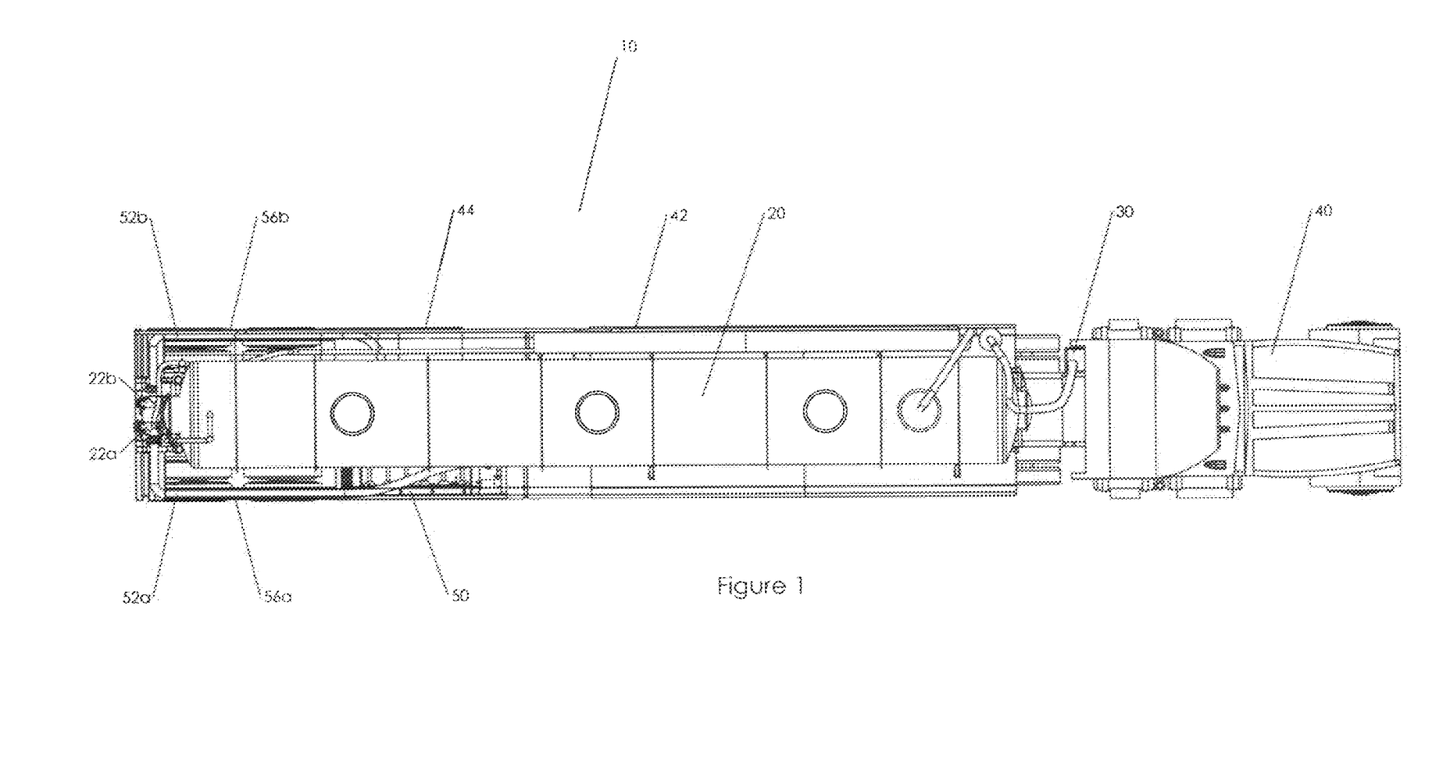
FIG. 1 is a plan view of a mobile water treatment apparatus according to an aspect of this disclosure.

FIG. 1 is a plan view of a mobile water treatment apparatus 10. Mobile water treatment apparatus 10 may include a motor vehicle 40 including a trailer 42, a storage tank 20, a vacuum/pump system 30, and filtration system 50 along with their respective connections. It should be appreciated that the vacuum/pump system 30, filtration system 50, storage tank 20 and their respective connections may be secured to trailer 42. Vacuum/pump system 30 may create a positive or negative pressure within storage tank 20 to on-load or off-load fluid into storage tank 20. In one aspect of the invention, vacuum/pump system 30 may be powered by motor vehicle 40. In an alternate aspect of the invention, vacuum/pump system 30 may be separate from motor vehicle 40 and may include its own power generating device. When vacuum/pump system 30 creates a negative pressure within tank 20, fluid is drawn into storage tank 20 through rear pipes 22a and 22b. Conversely, a positive pressure within tank 20 allows fluid to flow out of rear pipes 22a and 22b.

Storage tank 20 may have a capacity of 130 barrels, or 5460 gallons of fluid. Alternatively, storage tank 20 may have any other capacity known to a person of ordinary skill in the art. For example, the capacity of tank 20 may be between 20 barrels and 250 barrels of fluid. In one aspect of the invention, storage tank 20 may be rated to withstand 20 psi of interior pressure. Typically, fluid may be on-loaded into storage tank 20 at a rate of approximately 500 gallons per minute for each of the rear pipes 22a and 22b that is used. Conversely, fluid may be offloaded from storage tank 20 at approximately 500 gallons per minute for each of the rear pipes 22a and 22b that is used.

Filtration system 50 may be connected to rear pipes 22a and 22b through filtration input line 52a and filtration output line 52b. Toolbox 44 may be attached to trailer 42 and may be used to store additional filters for filtration system 50.

Figure 2:
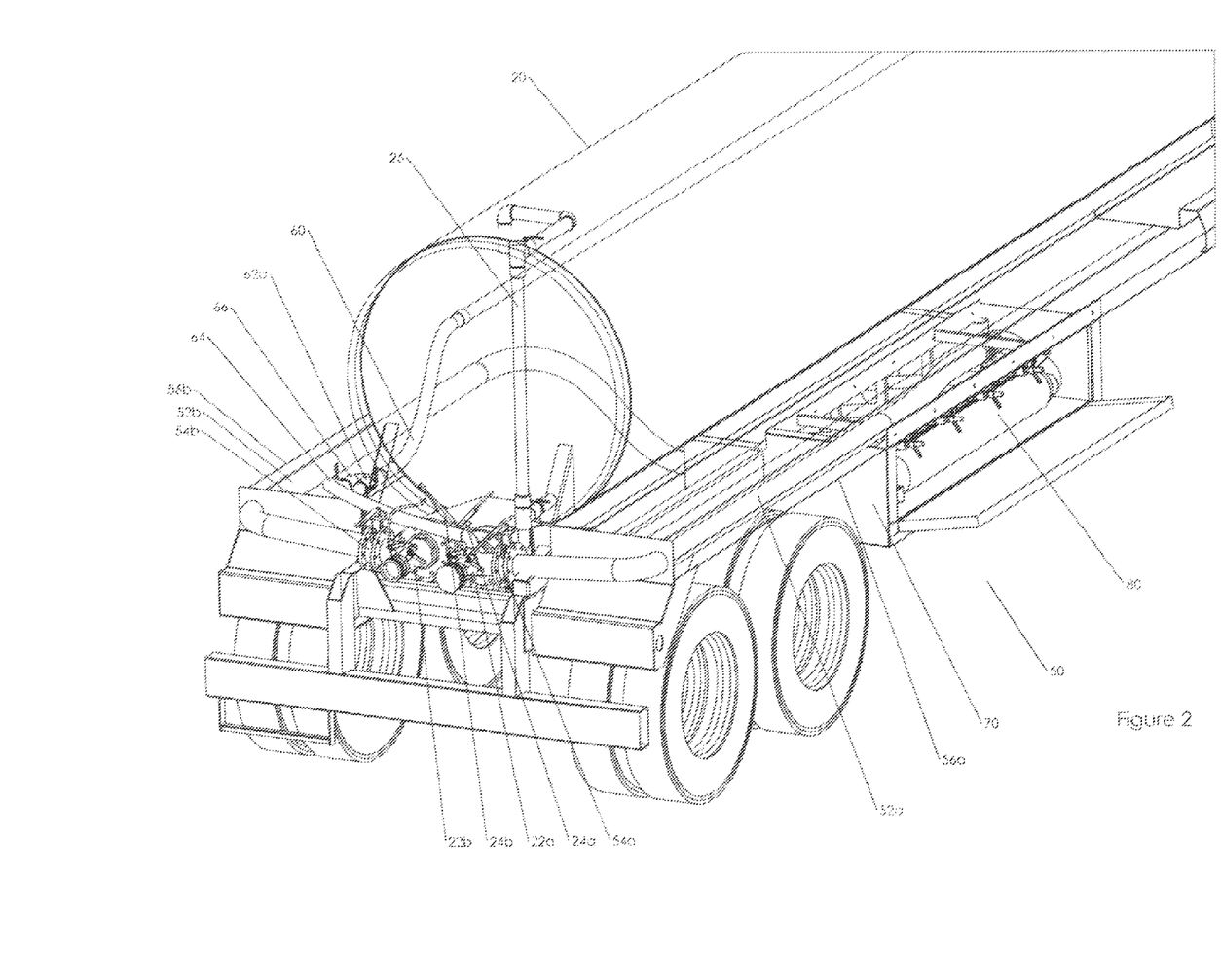
FIG. 2 is a perspective view of a mobile water treatment apparatus.
Figure 3:
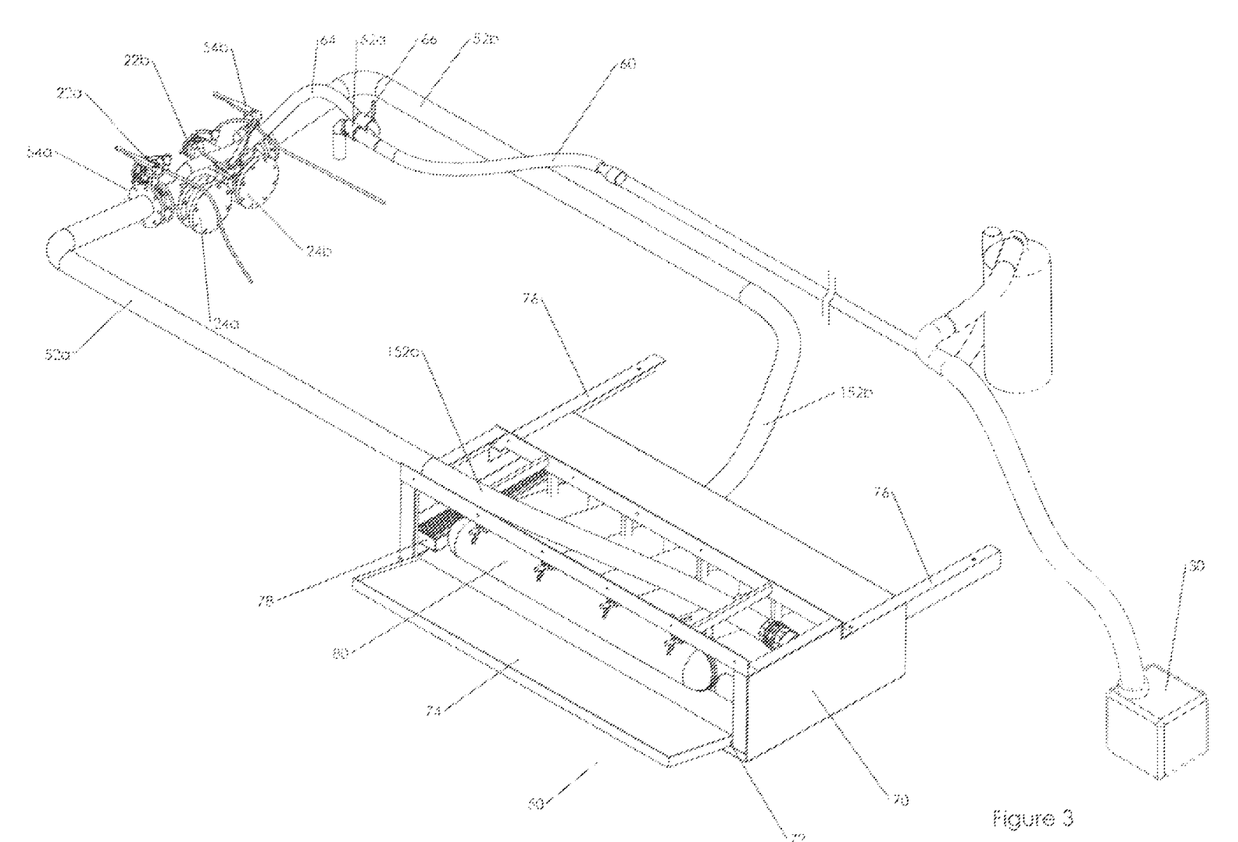
FIG. 3 is a perspective view of a mobile water treatment apparatus showing the fluid flow connections according to an aspect of this disclosure.

Referring now to FIG. 2 and FIG. 3, rear pipes 22a and 22b may be connected to tank 20 through tank opening valve 24a and tank opening valve 24b respectively. Filtration input line valve 54a may be provided between rear pipe 22a and filtration input line 52a. Similarly, filtration output line valve 54b may be provided between rear pipe 22b and filtration output line 52b. Sight glass 26 may be transparent and may be provided on the rear of storage tank 20 to display the flow rate into or out of storage tank 20, and also to show the fluid level within storage tank 20.

Filtration input line 52a may be enclosed by side tray 56a, and filtration output line 52b may be enclosed by side tray 56b. In one aspect of the invention, side trays 56a and 56b may be insulated or heated to prevent the fluid in filtration input line 52a or filtration output line 52b from freezing during operation of mobile treatment apparatus 10 in extreme weather.

Filtration air hose 64 may connect to filtration input line 52a. Filtration air hose 64 may connect to vacuum/pump air line 60 through filtration air valve 66. In one aspect of the invention, filtration air hose 64 may be positively pressurized to purge filtration input line 52a and filtration system 50 in order to replace filters 88 in filtration system 50.

In one aspect of the invention, filtration input line 52a may include input flex line 152a. Input flex line 152a may connect to the input side of filtration vessel 80 inside containment box 70. Similarly, filtration output line 52b may include output flex line 152b which may connect to the output side of filtration vessel 80.

Filtration system 50 may include containment box 70 and filtration vessel 80. In one aspect of the invention, containment box 70 may prevent excess fluid from reaching the outside of filtration system 50, thus preventing spillage and minimizing the environmental impact of the contaminates recovered by mobile water treatment apparatus 10. In an example of the invention, containment box 70 may include containment box lip 72 and containment box door 74. Containment box lip 72 may be provided at a suitable height to prevent excess fluid from flowing out of containment box 70. Containment box 70 may be insulated or heated to prevent the fluid in filtration system 50 from freezing in extreme weather. Containment box 70 may attach filtration system 50 to trailer 42 through containment box mounts 76. This attachment may be made with bolts or other non-permanent fixation devices known to a person of ordinary skill.

Figure 4:
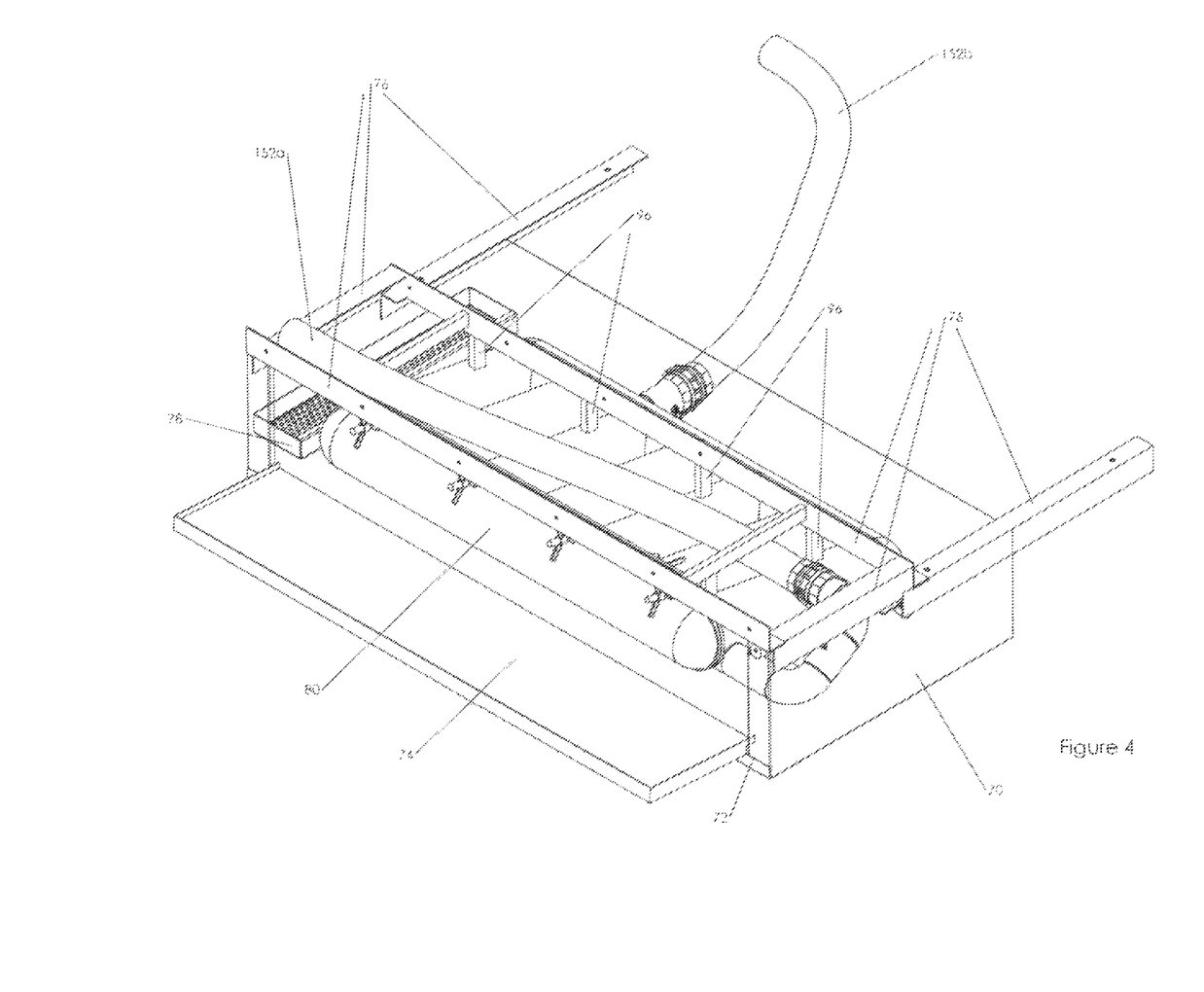
FIG. 4 is a perspective view of a containment box and filtration vessel according to one aspect of this disclosure.
Figure 5:
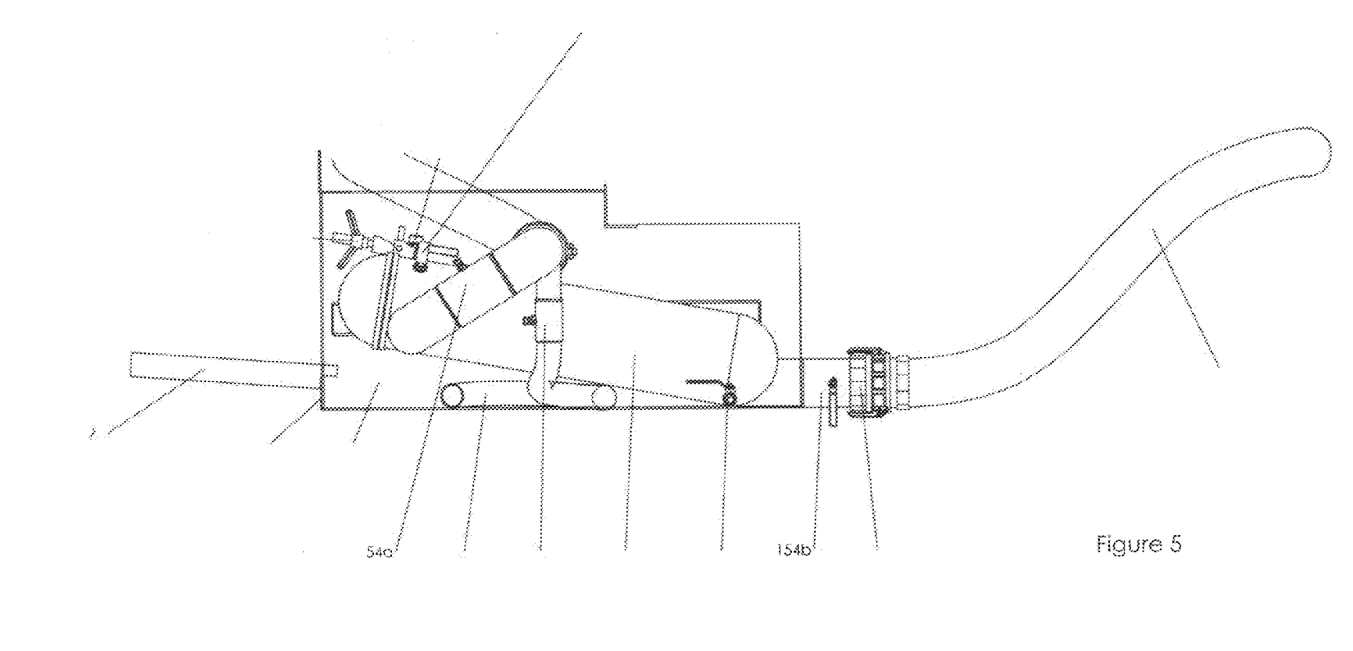
FIG. 5 is a side view of a containment box and filtration vessel according to one aspect of this disclosure.
Figure 6:
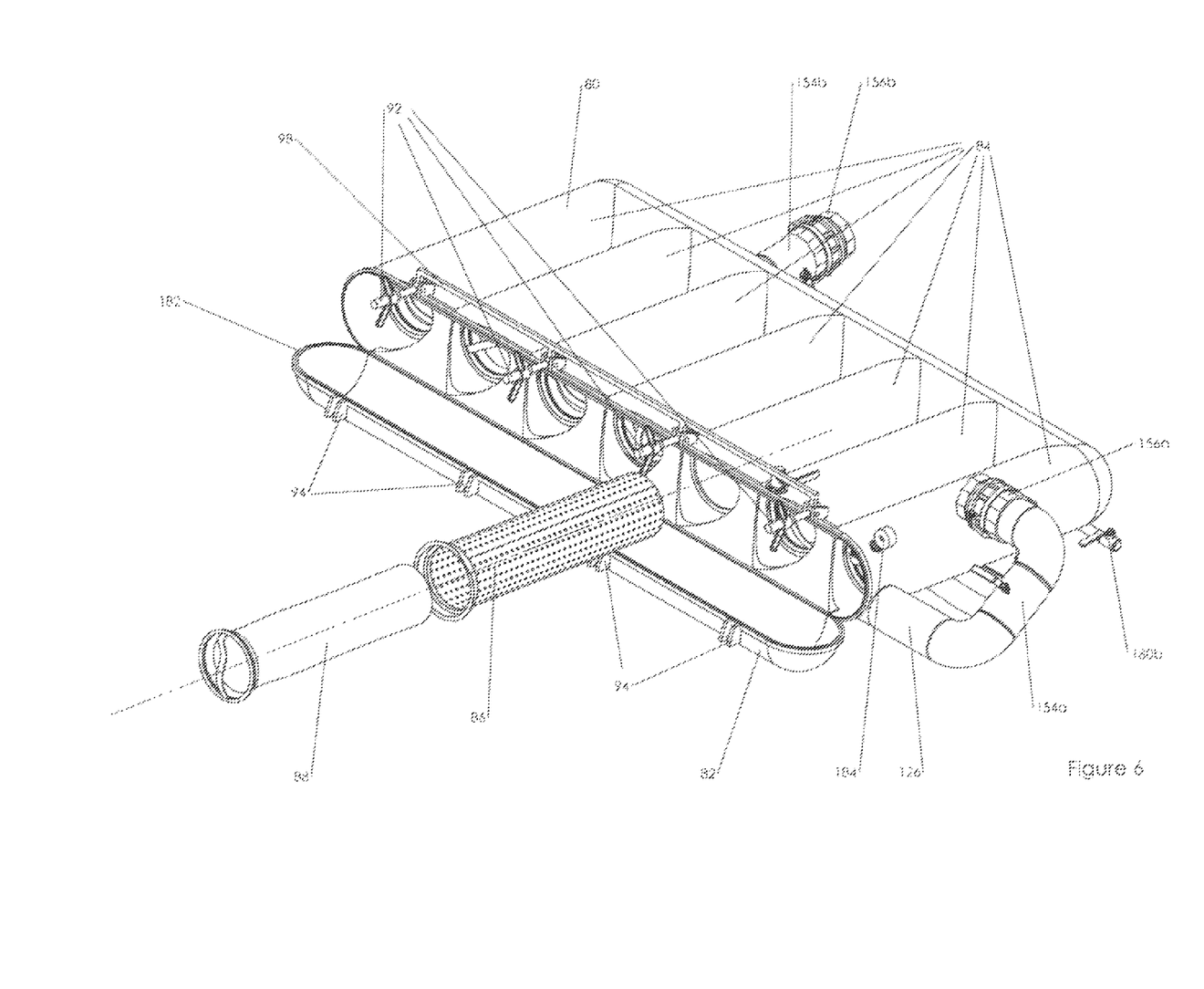
FIG. 6 is a partially exploded perspective view of a filtration vessel according to one aspect of this disclosure.

Referring now to FIGS. 4-6, input flex line 152a may be connected to filtration vessel 80 through input line lock 156a. Output flex line 152b may be connected to filtration vessel 80 through output line lock 156b. Input line lock 156a and output line lock 156b allow removal of filtration system 50 from mobile water treatment apparatus 10 without damaging input flex line 152a or output flex line 152b. Therefore, if a problem arises with filtration system 50, it may be removed and replaced with an alternate filtration system.

In one aspect of the invention, filtration vessel input valve 154a may be disposed between input line lock 154b and filtration vessel 80. Similarly, filtration vessel output valve 156b may be disposed between output line lock 154b and filtration vessel 80.

Containment box 70 may include a tray 78. Tray 78 may be made with perforated steel or other permeable material that may allow fluid flow through tray 78. In one aspect of the invention, used filters may be placed on tray 78 in containment box 70 to allow used filters to dewater into containment box 70. The excess water may then be removed from containment box 70 through vacuum hose 170 in cooperation with vacuum/pump system 30. This may be accomplished by creating a negative pressure within storage tank 20 and closing valves 154a and 24b, while opening valves 24a and 54a. In one aspect of the invention, vacuum hose 170 is connected to input flex line 152a though vacuum hose valve 172. In an alternate aspect of the invention, vacuum hose 170 may be connected to output flex line 152a. Vacuum hose valve 172 may be located between input line lock 156a and filtration vessel input valve 154a, or connected elsewhere on the inlet or outlet side of filtration vessel 80. In a further aspect of the invention, containment box 70 may contain a sump area that is configured to allow excess fluid to pool.

Filtration vessel 80 may be fixed to containment box 70 through filtration vessel mounts 96. In one aspect of the invention, filtration vessel 80 is permanently fixed to containment box 70 through welding or other permanent fixing means. Alternatively, filtration vessel 80 may be removably fixed to containment box 70 through bolts or other temporary fixing devices.

In an example of the invention, filtration vessel 80 may include vessel lid 82. An edge of vessel lid 82 may be surrounded by rubber gasket 182. Filtration vessel 80 may also include closure mechanism 90 which utilizes swing bolts 92 and lid clasps 94 to ensure that filtration vessel 80 may be pressurized for adequate filtration by sealing vessel lid 82 and rubber gasket 182 to filtration vessel 80.

In another aspect of the invention, filtration vessel 80 includes input relief valve 180a and output relief valve 180b. Relief valves 180a and 180b may be provided as an additional means to release the pressure within filtration vessel 80. Relief valve 180a may also be used to evacuate air from filtration vessel 80 as fluid enters the vessel. Relief valve 180b may be used to drain fluid from filtration vessel 80, and may be used to test the post filtration water quality. Filtration vessel 80 may also include pressure gauge 184 to display the inlet pressure on the fluid input side of filtration vessel 80. In one aspect of the present invention, pressure gauge 184 is an analog pressure gauge. In an alternate aspect, pressure gauge 184 is a digital pressure gauge and may transmit a signal to a display device to indicate when filters 88 are dirty and in need of replacement. Furthermore, pressure gauge 184 may remotely inform an operator when filters 88 are in need of replacement. In another example of the invention, pressure gauge 184 may be monitored by a controller or computer system that also monitors and controls the system valves.

In one aspect of the invention, filtration system 50 utilizes removable filters 88. As shown in FIG. 6, filtration vessel 80 may include vessel cylindrical conduits 84. Each filter 88 may rest in a basket 86. The filter 88 and basket 86 assemblies may rest inside conduits 84. Filters 88 remove contaminates from a fluid flowing into filtration vessel 80. In one aspect of the invention, baskets 86 may be made from a steel microscreen mesh. The baskets 86 allow filters 88 to maintain the appropriate shape while filtering the fluid. Furthermore, baskets 86 prevent filters 88 from deforming or developing rips or tears in the filtering material. In an alternate aspect of the invention, different filters 88 may be used to filter different materials, including but not limited, to hydrocarbons, suspended solids, bacteria, and heavy metals. Furthermore, filters 88 may be created from a material that withstands exposure to excessive heat or corrosive materials.

In another aspect of the invention, sight glass 126 is transparent and may be disposed between filtration vessel 80 and filtration vessel input valve 154a to show the fluid flow into filtration vessel 80.

In one aspect of the invention, filters 88 may be disposable. For example, disposable filters 88 may be bag or sock filters. In an alternate aspect of the invention, filters 88 may be reusable. Furthermore, baskets 86 may be manufactured to filter out contaminates and baskets 86 may be utilized as reusable filters. When filters 88 become clogged with contaminates, the pressure within filtration vessel 80 increases. When the pressure within filtration vessel 80 reaches a predetermined pressure as depicted on pressure gauge 184, the mobile water treatment apparatus filtration process is stopped to replace dirty filters 88. To replace filters 88, filtration input line valve 54a is closed and filtration air valve 66 is opened to purge excess fluid from filtration vessel 80. Once fluid is purged, filtration air valve 66, filtration vessel input valve 154a, and filtration vessel output valve 154b are closed. Vessel lid 82 may be opened using swing bolt linkage 98 to rotate swing bolts 92 to release the coupling between swing bolts 92 and lid clasps 94. Dirty filters 88 may then be removed and replaced with clean filters. Dirty filters may then be placed on tray 78 in containment box 70 to allow excess fluid to leave the dirty filters.

In an example of the invention, each clean filter-basket-conduit within filtration vessel 80 supports a flow rate of approximately 100-500 gallons per minute. Filtration system 50 pictured in FIG. 6 may include 7 conduits and may therefore support a flow rate of approximately 700-3500 gallons per minute when filters 88 are clean. In an alternate example of the invention, filtration system 50 may include a pump or other fluid propelling device to propel fluid through the filtration system. The flow rate of the fluid through the filtration system may range between 0-3500 gallons per minute, depending on the vacuum/pump system and the number of conduits. The pressure within filtration vessel 80 generally may not exceed 100 psi as most commercially available filtration elements cannot sustain a pressure greater than 100 psi. However, the pressure within filtration vessel 80 may exceed 100 psi if the filtration elements are constructed to withstand higher pressures. Filtration system 50 may also be composed of alternate configurations of conduits. For example, filtration system 50 may include fewer conduits or a larger number of conduits to support a varying number of filters. The conduits may be connected in parallel, series, a combination of parallel and series, or an alternate pattern. In another aspect of the invention, the filters, baskets, and conduits may be other shapes including ovals, triangles, squares, pentagons, hexagons, or any other polygon.

In an aspect of the invention, the system utilizes a filtration system 50 with removable filters. However a person of ordinary skill would recognize that alternate filtration systems may be used to remove fluid contaminates. For example, mobile water treatment apparatus 10 may utilize a membrane filtration system, a centrifugal filtration system, a hydrocyclone filtration system, an electro-coagulation filtration system, a Voraxial separator filtration system, an Ecosphere Ozonix filtration system, a Tekleen automatic filtration system, a 3M CUNO filtration system, a Purolator filtration system, or the like.

Figure 8:
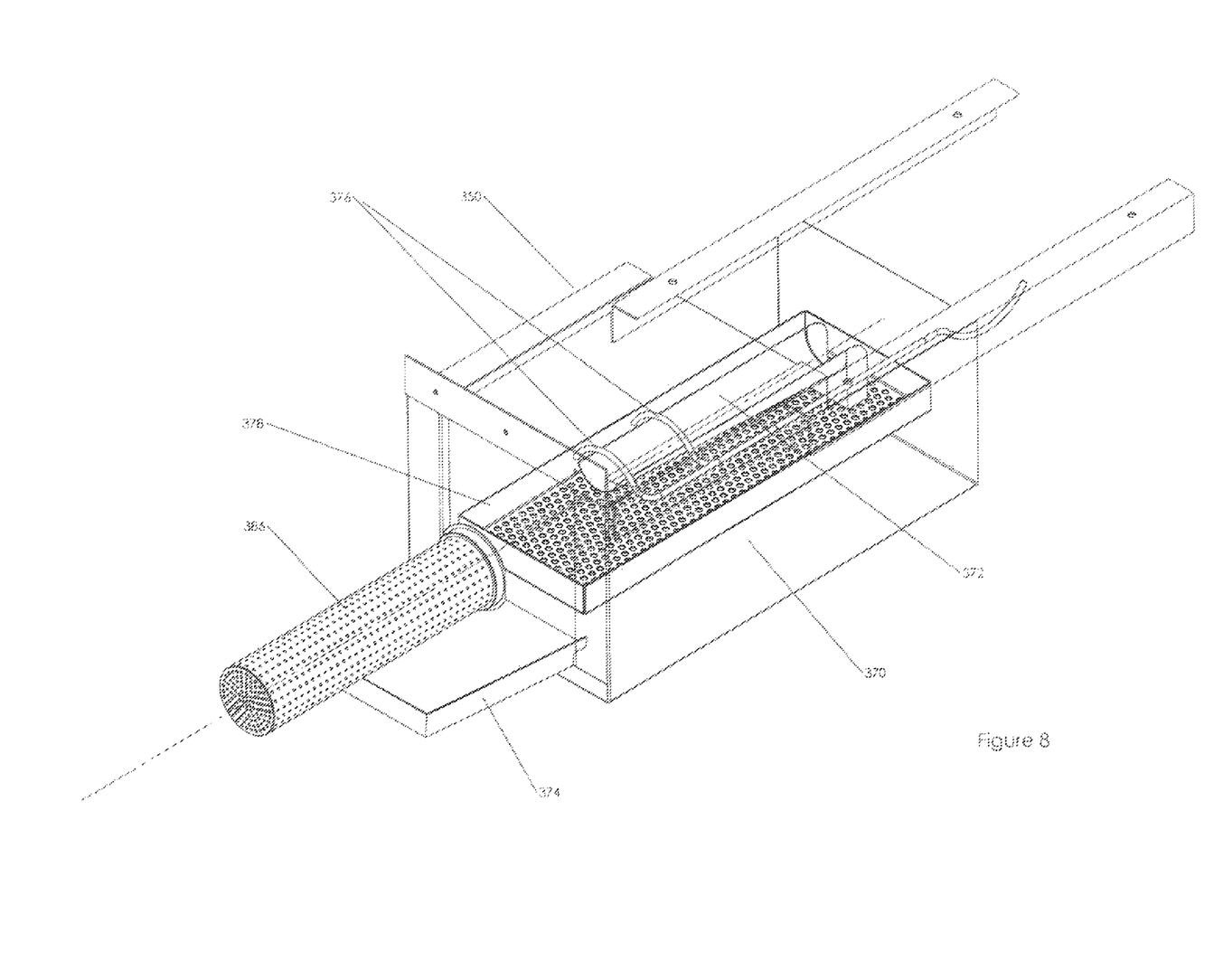
FIG. 8 is a partially exploded perspective view of a purge vessel according to an aspect of this disclosure.

In another aspect of the invention using reusable filters, reusable filter 386 may be cleaned by removing the filtered contaminates into a bucket or into purge vessel 350 as depicted in FIG. 8. Purge vessel 350 may include purge box 370 and purge box door 374. In an example of the invention, reusable filter 386 may be loaded into purge vessel 350 onto arm 372. Air lines 376 may be connected to the pressurized air line in motor vehicle 40 and may be used to force air across the surface of reusable filter 386 to remove contaminates. Arm 372 may also be used to prevent contaminates from being forced to the opposite side of reusable filter 386. Drawer 378 along with purge box 370 may receive and retain the contaminates for proper disposal. Once reusable filter 386 is free of contaminates, reusable filter 386 may again be used in filtration vessel 80.

In an aspect of the invention, filtration system 50 is attached to trailer 42 below storage tank 20. Furthermore, filtration vessel 80 is arranged to allow a horizontal fluid flow through filtration system 50. However, a person of ordinary skill would understand that filtration system 50 may be attached to any part of mobile water treatment apparatus 10 and is not limited to the location below storage tank 20. For example, filtration system 50 may be attached to the rear of the cab of motor vehicle 40, or the rear of trailer 42. Furthermore, filtration system 50 may be arranged to allow fluid to flow vertically through filtration system 50.

In one aspect of the invention, the fluid valves in mobile water treatment apparatus 10 are manually operated mechanical ball valves. In alternative aspects of the invention, the valves may be pneumatic or electrical, including but not limited to knife gate valves, butterfly valves, ball valves, solenoid valves, or the like. Furthermore all pneumatic and/or electrical valves may be electronically monitored and operated by a controller or computer system.

Figure 7:
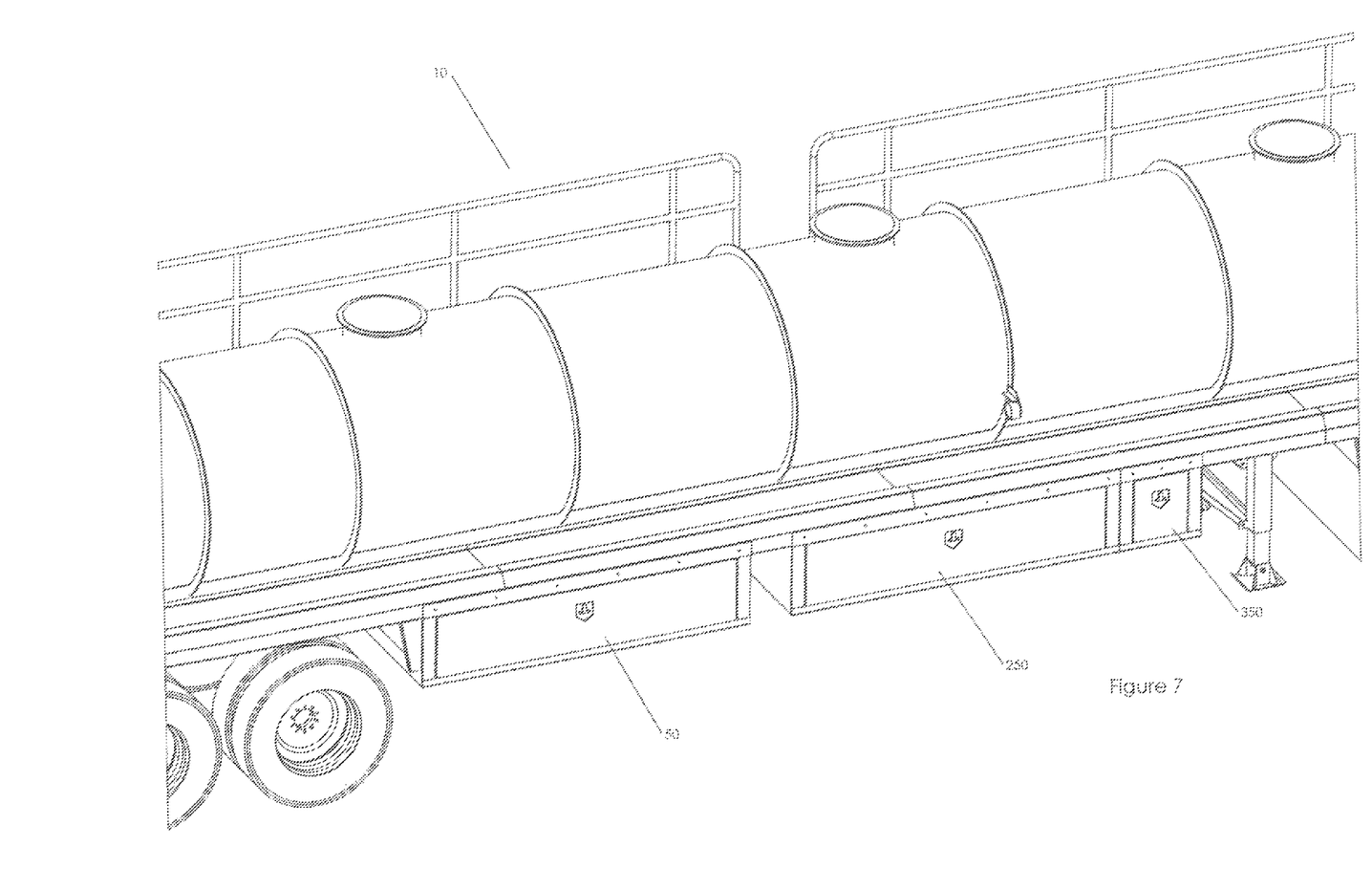
FIG. 7 is a perspective view of a mobile water treatment apparatus according to an aspect of this disclosure.

In another aspect of the invention, mobile water treatment apparatus 10 may utilize a plurality of filtration systems 50 connected in series or parallel. For example, FIG. 7 depicts a mobile water treatment apparatus 10 with filtration system 50 and filtration system 250. Each filtration system may filter out different sizes of fluid particulates, or serve alternate filtration purposes. Furthermore, each filtration system may contain different filtration devices.

An exemplary implementation of aspects of this disclosure is described below by way of example. In an example of the present invention, vacuum/pump 30 creates a negative pressure in storage tank 20. Dirty water is on-loaded at a first location into storage tank 20 through rear pipes 22a and 22b by opening tank opening valves 24a and 24b. Once on-loading is complete, tank opening valves 24a and 24b are closed, thus containing the dirty water within storage tank 20. Mobile water treatment apparatus 10 then transports the dirty water within storage tank 20 to a second location. At the second location, vacuum/pump 30 creates a positive pressure within storage tank 20. Next, tank opening valve 24a is opened and dirty water flows through filtration input line 52a, through filtration vessel input valve 154a, and passes through filters 88 within filtration vessel 80. Filtered water exits filtration vessel 80 past filtration vessel output valve 154b, and flows through filtration output line 52b to rear pipe 22b. Tank opening valve 24b remains closed allowing the filtered water to exit rear pipe 22b to the outside of mobile water treatment apparatus 10. In this configuration, rear pipe 22a may contain a cap, valve, or blockage to prevent water discharge through rear pipe 22a. Filtering the water after the water is discharged from storage tank 20 provides the advantage of allowing storage tank 20 to always be dirty. Therefore, a single mobile water treatment apparatus 10 may provide both filtered water and/or dirty water in an application where water filtration is not desired.

In an alternative aspect of the invention, a line may be attached to filtration vessel output valve 154b to allow the filtered water to exit mobile water treatment apparatus 10.

In another aspect of the invention, in the case where fluid filtration is not desired, mobile water treatment apparatus 10 transports the dirty water to the second location and off loads the dirty fluid by opening either or both of tank opening valves 24a and 24b while filtration input line valve 54a and filtration output line valve 54b remain closed.

In another aspect of the invention, filtration system 50 may filter the dirty water as the dirty water is on-loaded into storage tank 20. This is accomplished by creating a negative pressure within storage tank 20, closing tank opening valve 24a, opening filtration input and output line valves 54a and 54b, opening filtration vessel input and output valves 154a and 154b, and opening tank opening valve 24b. In this configuration, rear pipe 22b may contain a cap, valve, or blockage to prevent the filtered water from discharging to the outside of mobile water treatment apparatus 10.

In an alternate aspect of the invention, mobile water treatment apparatus 10 may be utilized as an on-site filtration system. This may be accomplished by bypassing storage tank 20 and connecting an external vacuum/pump system to either rear pipe 22a or rear pipe 22b. With tank opening valves 24a and 24b closed, fluid may be propelled into filtration system 50 and discharged from rear pipe 22b.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method for mobile water treatment comprising:
   retrieving a fluid from a well site, the fluid being generated by production or recovery in an oil or gas well;
   storing the fluid in a fluid storage container attached to a motor vehicle;
   transporting the fluid in the fluid storage container of the motor vehicle to a second location;
   filtering the fluid through a filtration system attached to the motor vehicle; and
   dispensing filtered fluid from the fluid storage container to the second location.

2. The method according to claim 1, wherein the filtering is performed as the fluid flows out of the fluid storage container.

3. The method according to claim 1, wherein the filtration system utilizes removable filters.

4. The method according to claim 1, further comprising creating a negative pressure within the fluid storage container to retrieve the fluid.

5. The method according to claim 1, wherein the fluid is filtered at a rate of at least 100 gallons per minute.

6. The method according to claim 1, wherein the fluid is non-potable.

7. The method according to claim 1, wherein filtering the fluid through a filtration system attached to the motor vehicle includes passing the fluid through a filtration system including a plurality of filters.

8. The method according to claim 7, wherein the plurality of filters are connected in parallel.

9. The method according to claim 1, wherein filtering the fluid through a filtration system attached to the motor vehicle includes passing the fluid through a first filtration system and a second filtration system, the first filtration system and the second filtration system being connected in series.

10. The method according to claim 1, wherein filtering the fluid through a filtration system attached to the motor vehicle includes passing the fluid through a first filtration system or a second filtration system, the first filtration system and the second filtration system being connected in parallel.

11. The method according to claim 9, wherein the first filtration system or the second filtration system includes a plurality of filters.

12. The method according to claim 10, wherein the first filtration system or the second filtration system includes a plurality of filters.

13. A method for mobile water treatment comprising:
   storing contaminated fluid recovered from a well site in a fluid storage container attached to a motor vehicle, the contaminated fluid being flowback or produced water generated by production or recovery in an oil or gas well;
   transporting the contaminated fluid in the fluid storage container of the motor vehicle to a second location;
   filtering the contaminated fluid through a filtration system attached to the motor vehicle; and
   dispensing filtered fluid from the fluid storage container to the second location.

14. The method according to claim 13, wherein the contaminated fluid is filtered at a rate of at least 100 gallons per minute.

15. The method according to claim 13, wherein filtering the contaminated fluid through a filtration system attached to the motor vehicle includes passing the contaminated fluid through a filtration system including a plurality of filters.

16. The method according to claim 15, wherein the plurality of filters are connected in parallel.

17. The method according to claim 13, wherein filtering the contaminated fluid through a filtration system attached to the motor vehicle includes passing the contaminated fluid through a first filtration system and a second filtration system, the first filtration system and the second filtration system being connected in series.

18. The method according to claim 13, wherein filtering the contaminated fluid through a filtration system attached to the motor vehicle includes passing the contaminated fluid through a first filtration system or a second filtration system, the first filtration system and the second filtration system being connected in parallel.

19. The method according to claim 17, wherein the first filtration system or the second filtration system includes a plurality of filters.

20. The method according to claim 18, wherein the first filtration system or the second filtration system includes a plurality of filters.

* * * * *